(12) United States Patent
Sasaki et al.

(10) Patent No.: US 10,175,542 B2
(45) Date of Patent: Jan. 8, 2019

(54) LIQUID CRYSTAL DISPLAY DEVICE

(71) Applicant: SHARP KABUSHIKI KAISHA, Sakai, Osaka (JP)

(72) Inventors: Takahiro Sasaki, Sakai (JP); Iori Aoyama, Sakai (JP); Yuichi Kita, Sakai (JP); Kazutaka Hanaoka, Sakai (JP); Hidefumi Yoshida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/566,452

(22) PCT Filed: Apr. 11, 2016

(86) PCT No.: PCT/JP2016/061692
§ 371 (c)(1),
(2) Date: Oct. 13, 2017

(87) PCT Pub. No.: WO2016/167219
PCT Pub. Date: Oct. 20, 2016

(65) Prior Publication Data
US 2018/0095311 A1 Apr. 5, 2018

(30) Foreign Application Priority Data
Apr. 15, 2015 (JP) .................. 2015-083344

(51) Int. Cl.
*G02F 1/1343* (2006.01)
*G02F 1/1335* (2006.01)
*G02F 1/1362* (2006.01)

(52) U.S. Cl.
CPC .......... *G02F 1/1343* (2013.01); *G02F 1/1362* (2013.01); *G02F 1/133514* (2013.01);
(Continued)

(58) Field of Classification Search
CPC ............. G02F 1/1343; G02F 1/134309; G02F 1/133514; G02F 1/1362; G02F 1/133602; G02F 2001/134381
See application file for complete search history.

(56) References Cited

U.S. PATENT DOCUMENTS

2005/0024548 A1 2/2005 Choi et al.
2014/0111561 A1 4/2014 Iyama et al.
(Continued)

FOREIGN PATENT DOCUMENTS

JP 2002-365657 A 12/2002
JP 2006-523850 A 10/2006
(Continued)

*Primary Examiner* — Erin F Heard
(74) *Attorney, Agent, or Firm* — ScienBiziP, P.C.

(57) ABSTRACT

A liquid crystal display device (100) includes a liquid crystal display panel (1) and an illumination element (2), and is capable of switching between: a first mode of displaying in which displaying is performed by using a plurality of color rays emitted from the illumination element; and a second mode of displaying in which the background is allowed to be perceived, with no color rays being emitted from the illumination element. Each pixel is, under the first mode of displaying, capable of switchably presenting a black displaying state with a vertical field being generated across the liquid crystal layer (30), a white displaying state with a lateral field being generated across the liquid crystal layer, or a transparent displaying state of allowing the rear face side to be visible in a see-through manner with no voltage applied to the liquid crystal layer, and, under the second mode of displaying, capable of switchably presenting a black displaying state with a vertical field being generated across the liquid crystal layer, a transparent displaying state of allowing the rear face side to be visible in a see-through manner with no voltage being applied to the liquid crystal layer, a white displaying state with essentially only a vertical field
(Continued)

being generated across the liquid crystal layer, or an intermediate level displaying state with essentially only a vertical field being generated across the liquid crystal layer.

9 Claims, 9 Drawing Sheets

(52) U.S. Cl.
CPC .. *G02F 1/133602* (2013.01); *G02F 1/134309* (2013.01); *G02F 2001/134381* (2013.01)

(56) References Cited

U.S. PATENT DOCUMENTS

| | | | |
|---|---|---|---|
| 2017/0285377 A1* | 10/2017 | Sasaki | G02F 1/133 |
| 2017/0285423 A1* | 10/2017 | Kita | G02F 1/1368 |
| 2018/0144695 A1* | 5/2018 | Kita | G02F 1/133 |

FOREIGN PATENT DOCUMENTS

| | | |
|---|---|---|
| WO | 2013/001979 A1 | 1/2013 |
| WO | 2016/035578 A1 | 3/2016 |

* cited by examiner

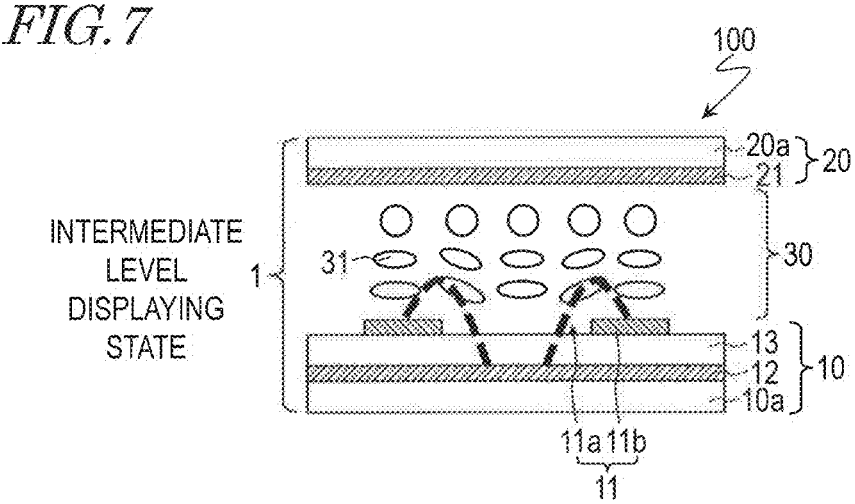
FIG.7
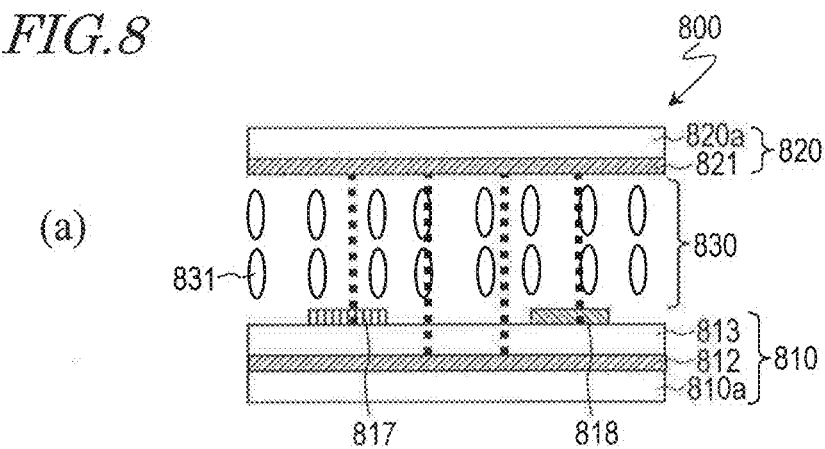
FIG.8
(a)
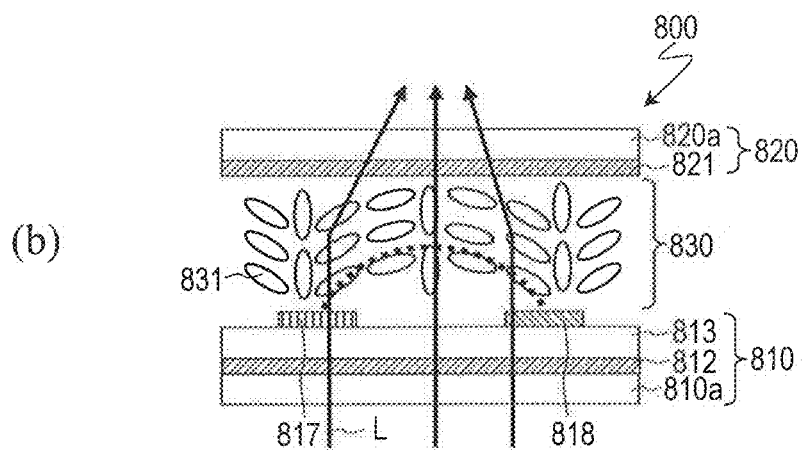
(b)

LIQUID CRYSTAL DISPLAY DEVICE

TECHNICAL FIELD

The present invention relates to a liquid crystal display device, and more particularly to a liquid crystal display device which is suitable for use as a see-through display.

BACKGROUND ART

In recent years, see-through displays have been attracting attention as the display devices for information display systems or digital signage. In a see-through display, the background (i.e., the rear-face side of the display panel) is visible in a see-through manner, thereby conducting displaying such that information which is displayed by the display panel is overlaid on the background. Thus, a see-through display has good appeal and eyecatchingness. Application of see-through displays to showcases and show windows has also been proposed.

In the case where a liquid crystal display device is used for a see-through display, its low efficiency of light utilization will be a detriment. The reasons for the low efficiency of light utilization of a liquid crystal display device are the color filters and polarizing plates, which are provided in generic liquid crystal display devices. The color filters and polarizing plates absorb light in specific wavelength regions or light of specific polarization directions.

This has led to the idea of using a liquid crystal display device of the field sequential method. Under the field sequential method, multicolor displaying is performed through time-division switching between colors of light with which a liquid crystal display panel is irradiated from an illumination element. This eliminates the need for color filters, thus improving the efficiency of light utilization. However, under the field sequential method, the liquid crystal display device is required to have a rapid response.

Patent Documents 1 and 2 disclose liquid crystal display devices having improved response characteristics because of an electrode structure being provided which is capable of switchably generating a vertical field or a lateral field across the liquid crystal layer. In the liquid crystal display devices disclosed in Patent Documents 1 and 2, a vertical field is generated across the liquid crystal layer in either one of the transition (rise) from a black displaying state to a white displaying state and the transition (fall) from a white displaying state to a black displaying state, while a lateral field (fringing field) is generated across the liquid crystal layer in the other. Therefore, the torque due to voltage application acts on the liquid crystal molecules in both of a rise and a fall, whereby good response characteristics are attained.

Patent Document 3 also proposes a liquid crystal display device which realizes rapid response by allowing an alignment regulating force by an electric field to act on the liquid crystal molecules at both of a rise and a fall.

CITATION LIST

Patent Literature

[Patent Document 1] Japanese National Phase PCT Laid-Open Publication No. 2006-523850
[Patent Document 2] Japanese Laid-Open Patent Publication No. 2002-365657
[Patent Document 3] International Publication No. 2013/001979

SUMMARY OF INVENTION

Technical Problem

However, it has been found that, when the liquid crystal display devices disclosed in Patent Documents 1, 2 and 3 are used for a see-through display, the problem of background blur (it being perceived as double images) may occur for reasons which will be specifically described later, thus resulting in a deteriorated display quality. Note that Patent Documents 1, 2 and 3 fail to mention such usage (application to see-through displays), and the presence of the aforementioned problem is a new finding made by the inventors.

Moreover, with respect to the case of allowing the background to be seen, the inventors have considered displaying methods which drive pixels in a liquid crystal display panel without allowing light to be go out from the illuminator (i.e., without performing displaying under the field sequential method), such that transmittance is controlled in a pixel-by-pixel manner. In such displaying methods, a frame, an effect-image, or the like may be presented as effects to be overlaid on the background. For example, gradation may be applied to the background, or other enhancements may also be made.

However, the inventors have found a problem in that, in the aforementioned manner of effects-displaying while the illuminator is turned off, the background may appear blurred as seen through any regions where effects are displayed at intermediate gray scale levels.

The present invention has been made in view of the above problems and an objective thereof is to provide, as a liquid crystal display device which is suitable for use as a see-through display, a liquid crystal display device which performs displaying in a manner that excels in both response characteristics and display quality when displaying an image by using light from an illuminator, and which allows the background to be clearly seen.

Solution to Problem

A liquid crystal display device according to an embodiment of the present invention is a liquid crystal display device comprising: a liquid crystal display panel including a first substrate and a second substrate opposed to each other and a liquid crystal layer interposed between the first substrate and the second substrate; and an illumination element provided at a rear face of the liquid crystal display panel, the illumination element being capable of switchably irradiating the liquid crystal display panel with a plurality of color rays and being light-transmissive when not radiating any color rays, the liquid crystal display device having a plurality of pixels arranged in a matrix array on the liquid crystal display panel, wherein, the first substrate includes a first electrode provided in each of the plurality of pixels, and a second electrode provided under the first electrode via an insulating layer, the second electrode generating a lateral field across the liquid crystal layer in cooperation with the first electrode; the second substrate includes a third electrode opposed to the first electrodes and the second electrodes, the third electrode generating a vertical field across the liquid crystal layer in cooperation with the first electrode and the second electrode; the liquid crystal display device is configured to be capable of switching between a first mode of displaying where multicolor displaying is performed by using the plurality of color rays emitted from the illumination element and a second mode of displaying where a background is allowed to be perceived through the illumination element with no color rays being emitted from the illumination element; each of the plurality of pixels is, under the first mode of displaying, capable of switchably presenting a black displaying state of performing black displaying with a vertical field being generated across the liquid crystal layer, a white displaying state of performing white displaying with a lateral field being generated across the liquid crystal layer, or a transparent displaying state of allowing the rear face side of the liquid crystal display panel to be visible in a see-through manner with no voltage being applied across the liquid crystal layer, and, under the second mode of displaying, capable of switchably presenting a black displaying state of performing black displaying with a vertical field being generated across the liquid crystal layer, a transparent displaying state of allowing the rear face side of the liquid crystal display panel to be visible in a see-through manner with no voltage being applied across the liquid crystal layer, a white displaying state of performing white displaying with essentially only a vertical field being generated across the liquid crystal layer, or an intermediate level displaying state of performing intermediate level displaying with essentially only a vertical field being generated across the liquid crystal layer.

In one embodiment, under the second mode of displaying, a first potential difference exists between the first electrode and the second electrode in the black displaying state, and, in the intermediate level displaying state and the white displaying state, a potential difference exists between the first electrode and the second electrode which is smaller than the first potential difference.

In one embodiment, under the first mode of displaying, a second potential difference exists between the first electrode and the second electrode in the white displaying state, and, under the second mode of displaying, a third potential difference which is smaller than the second potential difference exists in the white displaying state.

In one embodiment, under the second mode of displaying, an applied voltage to the first electrode and an applied voltage to the second electrode become lower with an increasing gray scale level from a lowest gray scale level to a gray scale level corresponding to the white displaying state.

In one embodiment, under the second mode of displaying, the applied voltage to the first electrode and the applied voltage to the second electrode become lower, at a constant rate, with an increasing gray scale level from the lowest gray scale level to the gray scale level corresponding to the white displaying state.

In one embodiment, a ratio of the applied voltage to the second electrode to the applied voltage to the first electrode is kept substantially constant between the lowest gray scale level and the gray scale level corresponding to the white displaying state.

In one embodiment, under the second mode of displaying, the applied voltage to the first electrode and the applied voltage to the second electrode remains equal between the lowest gray scale level and the gray scale level corresponding to the white displaying state.

One embodiment further comprises an insulating layer interposed between the first electrode and the second electrode, wherein, the first electrode includes a line portion and a space portion; and the insulating layer is exposed in a region corresponding to the space portion.

In one embodiment, multicolor displaying is performed by a field sequential method under the first mode, and multicolor displaying by a field sequential method is not performed under the second mode.

Advantageous Effects of Invention

According to an embodiment of the present invention, there is provided a liquid crystal display device which excels in both response characteristics and display quality and which is suitable for use as a see-through display, such that blur can be suppressed in a mode of displaying under which the background is allowed to be seen while controlling transmittance in a pixel-by-pixel manner.

BRIEF DESCRIPTION OF DRAWINGS

[FIG. 7] A cross-sectional view showing an alignment of liquid crystal molecules 31 in an intermediate level displaying state of the liquid crystal display device 100.

[FIG. 8] A cross-sectional view schematically showing a liquid crystal display device 800 according to Comparative Example, where (a) illustrates a state of performing black displaying, and (b) illustrates a state of performing white displaying.

DESCRIPTION OF EMBODIMENTS

Hereinafter, with reference to the drawings, embodiments of the present invention will be described. Note that the present invention is not limited to the following embodiments.

Figure 1:
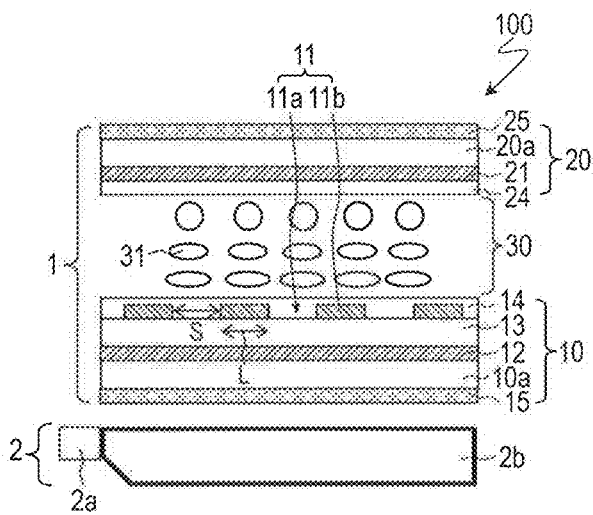
[FIG. 1] A cross-sectional view schematically showing a liquid crystal display device 100 according to an embodiment of the present invention.
Figure 2:
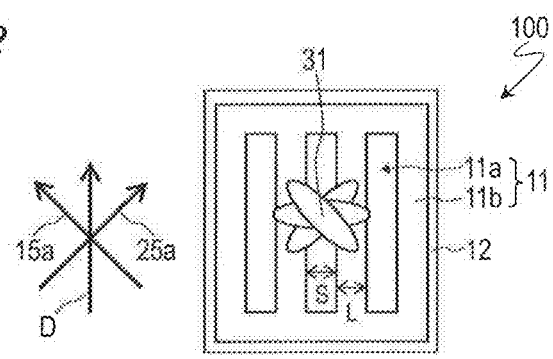
[FIG. 2] A plan view schematically showing a liquid crystal display device 100 according to an embodiment of the present invention.

With reference to FIG. 1 and FIG. 2, a liquid crystal display device 100 according to the present embodiment will be described. FIG. 1 is a cross-sectional view schematically showing the liquid crystal display device 100, and FIG. 2 is a plan view schematically showing the liquid crystal display device 100.

As shown in FIG. 1, the liquid crystal display device 100 includes a liquid crystal display panel 1 and an illumination element 2. Moreover, the liquid crystal display device 100 includes a plurality of pixels arranged in a matrix array. The liquid crystal display device 100 performs multicolor displaying by the field sequential method, as will be described later.

The liquid crystal display panel 1 includes a first substrate 10 and a second substrate 20 opposing each other, and a liquid crystal layer 30 interposed between the first substrate 10 and the second substrate 20. Hereinafter, between the first substrate 10 and the second substrate 20, the first substrate 10 being positioned relatively on the rear face side will be referred to as the "rear substrate", and the second substrate 20 being positioned relatively on the front face side (the viewer's side) will be referred to as the "front substrate".

The rear substrate 10 includes a first electrode 11 provided for each of the plurality of pixels and a second electrode 12 which cooperates with the first electrode 11 to generate a lateral field across the liquid crystal layer 30. Via an insulating layer 13, the first electrode 11 is located on the second electrode 12. Stated otherwise, the second electrode 12 is located under the first electrode 11 via the insulating layer 13. Hereinafter, between the first electrode 11 and the second electrode 12, the first electrode 11 taking a relatively upper position will be referred to as the "upper electrode", and the second electrode 12 taking a relatively lower position will be referred to as the "lower electrode". The lower electrode 12, insulating layer 13, and the upper electrode 11 are supported by an insulative transparent substrate (e.g., a glass substrate) 10a.

As shown in FIG. 1 and FIG. 2, the upper electrode has a plurality of slits 11a extending along a predetermined direction D and a plurality of branch portions (combteeth) 11b extending in parallel to the direction that the slits 11a extend (which hereinafter may also be referred to as the "slit direction") D. Note that the numbers of slits 11a and branch portions 11b are not limited to the examples illustrated in FIG. 1 and FIG. 2. There is no particular limitation as to the width S of each slit 11a. The width S of each slit 11a is typically not less than 2 μm and not more than 10 μm. Also, there is no particular limitation as to the width L of each branch portion 11b. The width L of each branch portion 11b is typically not less than 2 μm and not more than 10 μm. The upper electrode 11 is made of a transparent electrically conductive material (e.g., ITO).

The lower electrode 12 has no slits. That is, the lower electrode 12 is a so-called spread electrode. The lower electrode 12 is made of a transparent electrically conductive material (e.g., ITO).

There is no particular limitation as to the material of the insulating layer 13. As the material of the insulating layer 13, for example, an inorganic material such as silicon oxide ($SiO_2$) or silicon nitride ($SiN_X$), or an organic material such as a photo-sensitive resin can be used.

The front substrate 20 includes a third electrode (hereinafter referred to as the "counter electrode") 21 which opposes the upper electrode (first electrode) 11 and the lower electrode (second electrode) 12. The counter electrode 21 is supported by an insulative transparent substrate (e.g., a glass substrate) 20a.

The counter electrode 21 generates a vertical field across the liquid crystal layer 30 in cooperation with the upper electrode 11 and the lower electrode 12. The counter electrode 21 is made of a transparent electrically conductive material (e.g., ITO).

Although not shown in FIG. 1, a dielectric layer (overcoat layer) 22 may be formed on the counter electrode 21. The overcoat layer 22 is to be provided in order to weaken a vertical field which will inevitably occur when a lateral field is generated. The overcoat layer may be made of a photo-sensitive resin, for example.

The liquid crystal layer 30 contains liquid crystal molecules 31 having positive dielectric anisotropy. In other words, the liquid crystal layer 30 is made of a positive type liquid crystal material. Note that the orientation directions of the liquid crystal molecules 31 shown in FIG. 1 and FIG. 2 are those in a state where no voltage is applied to the liquid crystal layer 30.

The liquid crystal display panel 1 further includes a pair of horizontal alignment films 14 and 24 which oppose each other via the liquid crystal layer 30. One (which hereinafter may be referred to as the "first horizontal alignment film") 14 of the pair of horizontal alignment films 14 and 24 is formed on a surface of the rear substrate 10 that faces the liquid crystal layer 30. The other (which hereinafter may be referred to as the "second horizontal alignment film") 24 of the pair of horizontal alignment films 14 and 24 is formed on a surface of the front substrate 20 that faces the liquid crystal layer 30.

The first horizontal alignment film 14 and the second horizontal alignment film 24 have each been subjected to an alignment treatment, thus possessing an alignment regulating force that causes the liquid crystal molecules 31 in the liquid crystal layer 30 to be aligned in a predetermined direction (called a "pretilt direction"). As the alignment treatment, for example, a rubbing treatment or a photo-alignment treatment is conducted.

The pretilt direction defined by each of the first horizontal alignment film 14 and the second horizontal alignment film 24 is set so that the liquid crystal molecules 31 will take a twist alignment in a state where no voltage is applied to the liquid crystal layer 30 (i.e., a state where no electric field is generated). Specifically, the pretilt direction defined by each of the first horizontal alignment film 14 and the second horizontal alignment film 24 constitutes an angle of substantially 45° with the slit direction D. Moreover, the pretilt direction that is defined by the second horizontal alignment film 24 constitutes an angle of 90° with the pretilt direction that is defined by the first horizontal alignment film 14. Therefore, in a state where no voltage is applied to the liquid crystal layer 30, the liquid crystal molecules 31 take a 90° twisted alignment.

Moreover, the liquid crystal display panel 1 further includes a pair of polarizing plates 15 and 25 which oppose each other via the liquid crystal layer 30. A transmission axis (polarization axis) 15a of one (which hereinafter may be referred to as the "first polarizing plate") 15 of the pair of polarizing plates 15 and 25 is substantially orthogonal to a transmission axis (polarization axis) 25a of the other (which hereinafter may be referred to as the "second polarizing plate") 25, as shown in FIG. 2. In other words, the first polarizing plate 15 and the second polarizing plate 25 are placed in crossed Nicols. The respective transmission axes 15a and 25a of the first polarizing plate 15 and the second polarizing plate 25 are substantially parallel or substantially orthogonal to the pretilt directions which are respectively defined by the first horizontal alignment film 14 and the second horizontal alignment film 24. Therefore, the respective transmission axes 15a and 25a of the first polarizing plate 15 and the second polarizing plate 25 constitute angles of substantially 45° with respect to the slit direction D.

The illumination element (referred to as the "backlight") 2 is located on the rear face side of the liquid crystal display panel 1. The illumination element 2 is able to switchably irradiate the liquid crystal display panel 1 with a plurality of color rays including red light, green light, and blue light.

As the illumination element 2, an edgelight-type backlight such as that shown in FIG. 1 can be used. The edgelight-type backlight 2 includes a light source unit 2a and a light guide plate 2b. The light source unit 2a is capable of emitting a plurality of color rays including red light, green light, and blue light. For example, the light source unit 2a includes a red LED, a green LED, and a blue LED. The light guide plate 2b guides color rays which are emitted from the light source unit 2a to the liquid crystal display panel 1.

The light guide plate 2b of the illumination element 2 is disposed at the rear face of the liquid crystal display panel 1. However, the light guide plate 2b itself is light-transmissive. Therefore, the illumination element 2 is in a state of transmitting external light when the illumination element 2 is in an OFF state, i.e., when the light source unit 2a is not emitting any color rays. In other words, when the illumination element 2 is in an OFF state (i.e., when not performing field sequential driving), the viewer is able to perceive the background via the liquid crystal display panel 1 and the illumination element 2. The light guide plate 2b may be made of a light-transmitting material, e.g., plastic or glass, with a thickness of about 1 mm to 10 mm, for example.

Hereinafter, as a first mode of displaying, a case where the liquid crystal display device 100 performs multicolor displaying by the field sequential method will be described. Since the liquid crystal display device 100 is able to perform multicolor displaying by the field sequential method, the liquid crystal display panel 1 may not include color filters. A second mode of displaying is a mode of displaying where the pixels are driven while maintaining a state where the illumination element 2 allows external light to be transmitted therethrough, without performing displaying by the field sequential method. In this case, the viewer is able to see the background through the liquid crystal display panel 1, whose transmittance is controlled in a pixel-by-pixel manner. Details of the second mode of displaying will be described later.

First, the first mode of displaying will be described. In the first mode of displaying, when a predetermined voltage is applied between the upper electrode and the lower electrode 12 (i.e., a predetermined potential difference is introduced therebetween), a lateral field (fringing field) is generated across the liquid crystal layer 30. A "lateral field" is an electric field containing a component which is substantially parallel to the substrate plane. The direction of the lateral field which is generated by the upper electrode 11 and the lower electrode 12 is substantially orthogonal to the slit direction D.

On the other hand, when a predetermined voltage is applied between the counter electrode 21 and the upper electrode 11 and lower electrode 12 (i.e., a predetermined potential difference is introduced therebetween), a vertical field is generated. A "vertical field" is an electric field whose direction is substantially parallel to the substrate-plane normal direction.

The liquid crystal display device 100 is constructed so that the intensities of the lateral field and the vertical field can be controlled with respect to each pixel. Typically, the liquid crystal display device 100 is constructed so that a voltage differing from pixel to pixel can be respectively supplied for the upper electrode 11 and the lower electrode 12. Specifically, both the upper electrode 11 and the lower electrode 12 are formed in isolated pieces corresponding to pixels, such that each pixel has a switching element (e.g., a thin film transistor; not shown) electrically connected to the upper electrode 11 and a switching element (e.g., a thin film transistor; not shown) electrically connected to the lower electrode 12. A predetermined voltage is supplied to each of the upper electrode 11 and the lower electrode 12 via a corresponding switching element. Moreover, the counter electrode 21 is formed as a single continuous electrically conductive film that is common across all pixels. Therefore, a common potential is applied to the counter electrode 21 for all pixels.

Figure 3:
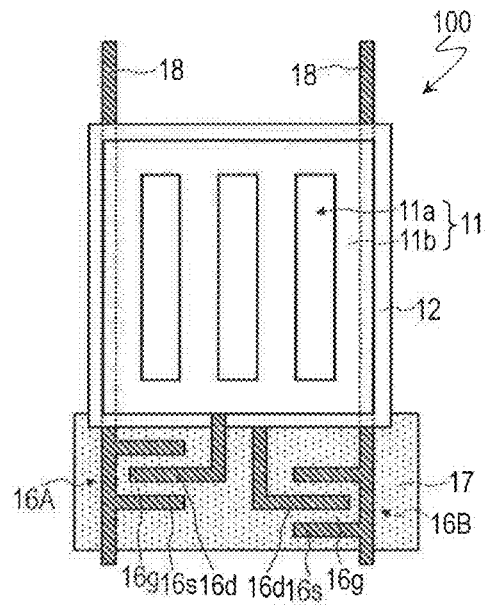
[FIG. 3] A plan view showing an example of a specific wiring structure on a rear substrate 10 of the liquid crystal display device 100.

FIG. 3 shows an example of a specific wiring structure for the rear substrate 10. In the construction shown in FIG. 3, a first TFT 16A corresponding to the upper electrode 11 and a second TFT 16B corresponding to the lower electrode 12 are provided for each pixel.

The respective gate electrodes 16g of the first TFT 16A and the second TFT 16B are electrically connected to a gate bus line (scanning line) 17. Herein, the portions of the gate bus line 17 that overlap the channel regions of the first TFT 16A and the second TFT 16B function as the gate electrodes 16g. Respective source electrodes 16s of the first TFT 16A and the second TFT 16B are electrically connected to source bus lines (signal lines) 18. Herein, portions branching out from the source bus lines 18 function as the source electrodes 16s. A drain electrode 16d of the first TFT 16A is electrically connected to the upper electrode 11. On the other hand, a drain electrode 16d of the second TFT 16B is electrically connected to the lower electrode 12. Note that the wiring structure of the rear substrate 10 is not limited to what is exemplified in FIG. 3.

In the liquid crystal display device 100 of the present embodiment, each of the plurality of pixels is able to switchably present: a "black displaying state", where black displaying is performed with a vertical field being generated across the liquid crystal layer 30; a "white displaying state", where white displaying is performed with a lateral field being generated across the liquid crystal layer 30; or a "transparent displaying state", where the rear face side (i.e., the background) of the liquid crystal display panel 1 is visible in a see-through manner with no voltage being applied to the liquid crystal layer 30.

Figure 4:
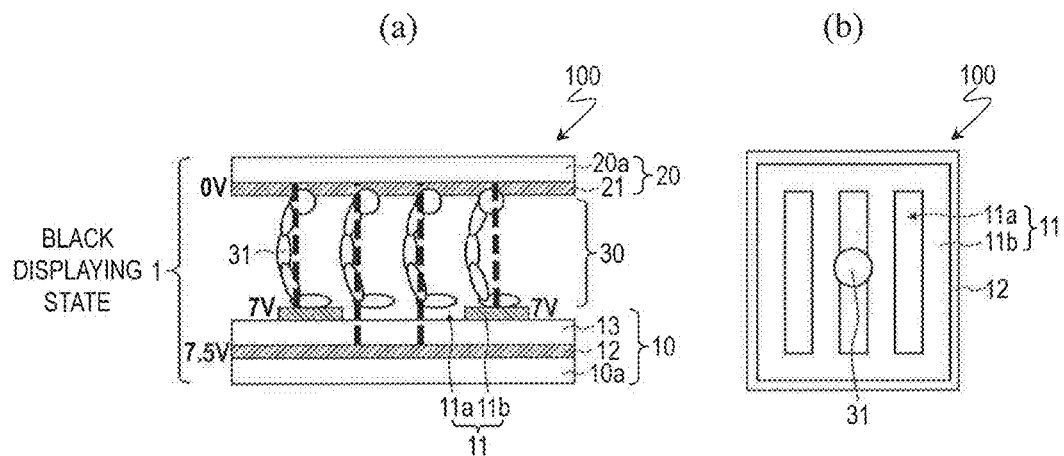
[FIGS. 4] (*a*) and (*b*) are a cross-sectional view and a plan view showing an alignment of liquid crystal molecules 31 in a black displaying state of the liquid crystal display device 100.

Hereinafter, with reference to FIG. 4, FIG. 5 and FIG. 6, the black displaying state, the white displaying state, and the transparent displaying state will be described in more detail.

FIGS. 4(a) and (b) shows an alignment of liquid crystal molecules 31 in a black displaying state. In the black displaying state, a predetermined voltage is applied between the counter electrode 21 and the upper electrode 11 and lower electrode 12 (e.g., potentials of 7 V, 7.5 V, and 0 V being respectively given to the upper electrode 11, the lower electrode 12, and the counter electrode 21), whereby a vertical field is generated across the liquid crystal layer 30. FIG. 4(a) schematically shows the electric lines of force in this state with broken lines.

In this black displaying state, as shown in FIGS. 4(a) and (b), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30). Note that the liquid crystal molecules 31 in the close neighborhood of the first horizontal alignment film 14 and the second horizontal alignment film 24 are strongly affected by the alignment regulating forces of the first horizontal alignment film 14 and the second horizontal alignment film 24, and therefore remain aligned substantially parallel to the substrate plane. However, since these liquid crystal molecules 31 are substantially parallel or substantially orthogonal to the transmission axis 15a of the first polarizing plate 15, they hardly confer any phase difference to the light passing through the first polarizing plate 15 and entering the liquid crystal layer 30, and thus hardly lower the contrast ratio.

Figure 5:
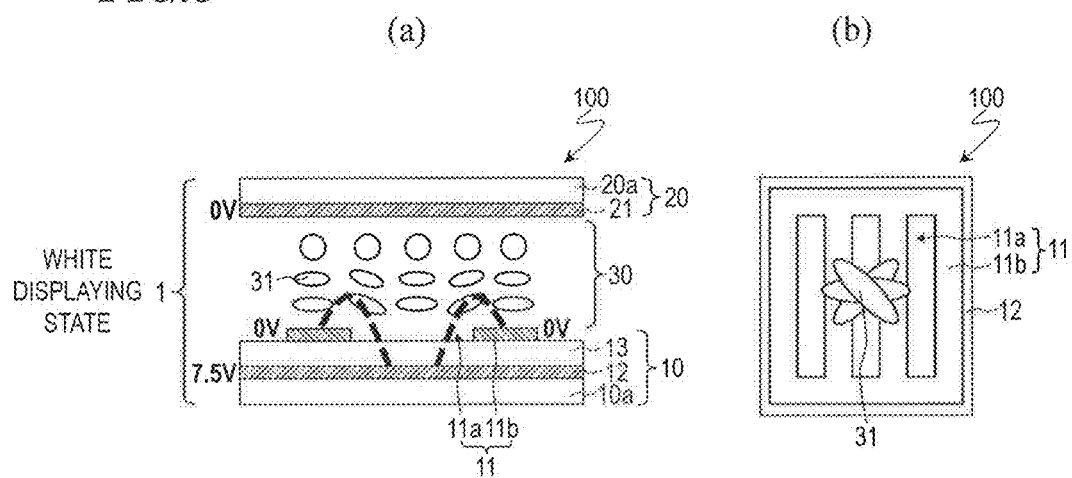
[FIGS. 5] (*a*) and (*b*) are a cross-sectional view and a plan view showing an alignment of liquid crystal molecules 31 in a white displaying state of the liquid crystal display device 100.
Figure 6:
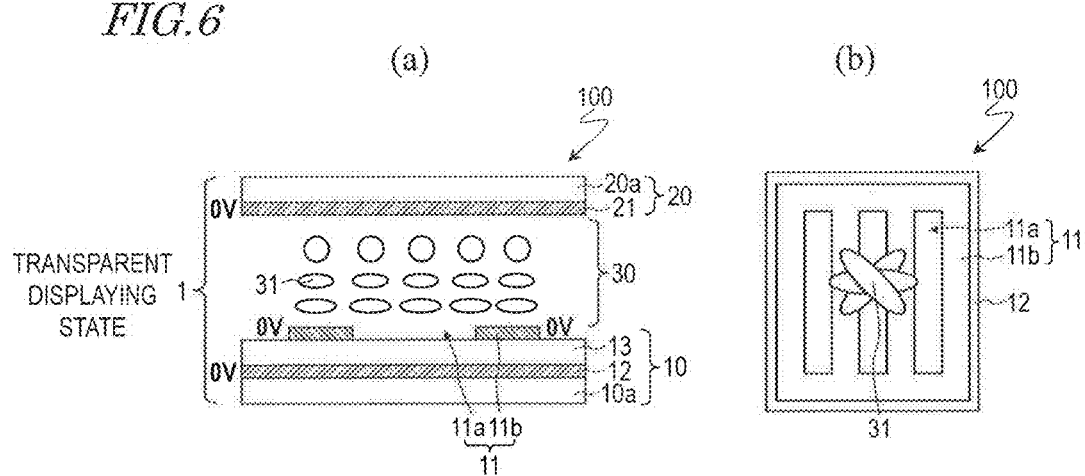
[FIGS. 6] (*a*) and (*b*) are a cross-sectional view and a plan view showing an alignment of liquid crystal molecules 31 in a transparent displaying state of the liquid crystal display device 100.

FIGS. 5(a) and (b) show an alignment of liquid crystal molecules 31 in the white displaying state. In the white displaying state, a predetermined voltage is applied between the upper electrode 11 and the lower electrode 12 (e.g., potentials of 0 V, 7.5 V, and 0 V being respectively given to the upper electrode 11, the lower electrode 12, and the counter electrode 21), thereby generating a lateral field (fringing field) across the liquid crystal layer 30. FIG. 5 schematically shows the electric lines of force in this state with broken lines.

In this white displaying state, as shown in FIGS. 5(a) and (b), the liquid crystal molecules 31 in the liquid crystal layer 30 are aligned substantially in parallel to the substrate plane (i.e., substantially vertically to the layer normal direction of the liquid crystal layer 30). More specifically, the liquid crystal molecules 31 in the neighborhood of the first horizontal alignment film 14 and the liquid crystal molecules 31 in the neighborhood of the second horizontal alignment film 24 are aligned so as to constitute an angle of substantially 90°, whereby the liquid crystal molecules 31 near the center along the thickness direction of the liquid crystal layer 30 are aligned substantially orthogonal to the direction (slit direction) D that the slits 11a of the upper electrode 11 extend.

Therefore, an average orientation direction of the bulk liquid crystal is substantially orthogonal to the slit direction D. It constitutes an angle of substantially 45° with respect to the respective transmission axes 15a and 25a of the first polarizing plate 15 and the second polarizing plate 25.

FIGS. 6(a) and (b) show an alignment of liquid crystal molecules 31 in the transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, the liquid crystal molecules 31 in the liquid crystal layer 30 take a twist alignment, as shown in FIGS. 6(a) and (b). In other words, the liquid crystal molecules 31 are aligned substantially in parallel to the substrate plane (i.e., substantially vertically to the layer normal direction of the liquid crystal layer 30). The liquid crystal molecules 31 in the neighborhood of the first horizontal alignment film 14 and the liquid crystal molecules 31 in the neighborhood of the second horizontal alignment film 24 are aligned so as to constitute an angle of substantially 90°, whereby the liquid crystal molecules 31 near the center along the thickness direction of the liquid crystal layer 30 are aligned substantially orthogonal to the slit direction D. Therefore, an average orientation direction of the liquid crystal molecules 31 in the bulk liquid crystal are substantially orthogonal to the slit direction D (i.e., constituting an angle of substantially 45° with respect to the respective transmission axes 15a and 25a of the first polarizing plate and the second polarizing plate 25). The light transmittance of each pixel of the liquid crystal display device 100 is the highest in this transparent displaying state (i.e., higher than those in the black displaying state and the white displaying state).

In addition to the aforementioned black displaying state, white displaying state, and transparent displaying state, each of the plurality of pixels of the liquid crystal display device 100 is able to present an "intermediate level displaying state" of presenting a luminance corresponding to an intermediate gray scale level, as shown in FIG. 7. In an intermediate level displaying state, as shown in FIG. 7, desired transmittance can be realized by adjusting the intensity of a lateral field (fringing field) to be generated across the liquid crystal layer 30, for example. Without being limited to a lateral field, a vertical field that is generated across the liquid crystal layer 30 may have its intensity adjusted in order to display intermediate gray scale levels. In displaying an intermediate gray scale level, both the lateral field and the vertical field may be adjusted in magnitude.

In the case where the illumination element 2 is not provided on the rear face of the liquid crystal display panel 1, displaying can be conducted in such a manner that information which is displayed by the liquid crystal display panel 1 is overlaid on the background. In this case, the pixels in a portion of the displaying region where the information is to be displayed present the black displaying state, the white displaying state, or an intermediate level displaying state, while the pixels in any other portion present the transparent displaying state. Switching between these displaying states may be conducted in the following manner, for example.

A driving circuit for a generic liquid crystal display device includes an 8-bit driver IC, and generates output voltages corresponding to 256 gray scale levels ($0^{th}$ to $255^{th}$ gray scale levels). In a generic liquid crystal display device, the $0^{th}$ gray scale level is assigned to the black displaying state; the $1^{st}$ to $254^{th}$ gray scale levels are assigned to intermediate level displaying states; and the $255^{th}$ gray scale level is assigned to the white displaying state.

In the liquid crystal display device 100 of the present embodiment, for example, the $0^{th}$ gray scale level may be assigned to the black displaying state, the $1^{st}$ to $253^{rd}$ gray scale levels assigned to intermediate level displaying states, the $254^{th}$ gray scale level assigned to the white displaying state, and the $255^{th}$ gray scale level assigned to the transparent displaying state, thereby being able to switch between the black displaying state, intermediate level displaying states, the white displaying state, and the transparent displaying state. Note that it is not necessary for the transparent displaying state to be associated with the $255^{th}$ gray scale level, and any gray scale level may be assigned to the transparent displaying state. In cases other than displaying in 256 gray scale levels exemplified herein, too, a specific gray scale level may be assigned to the transparent displaying state.

Figure 10:
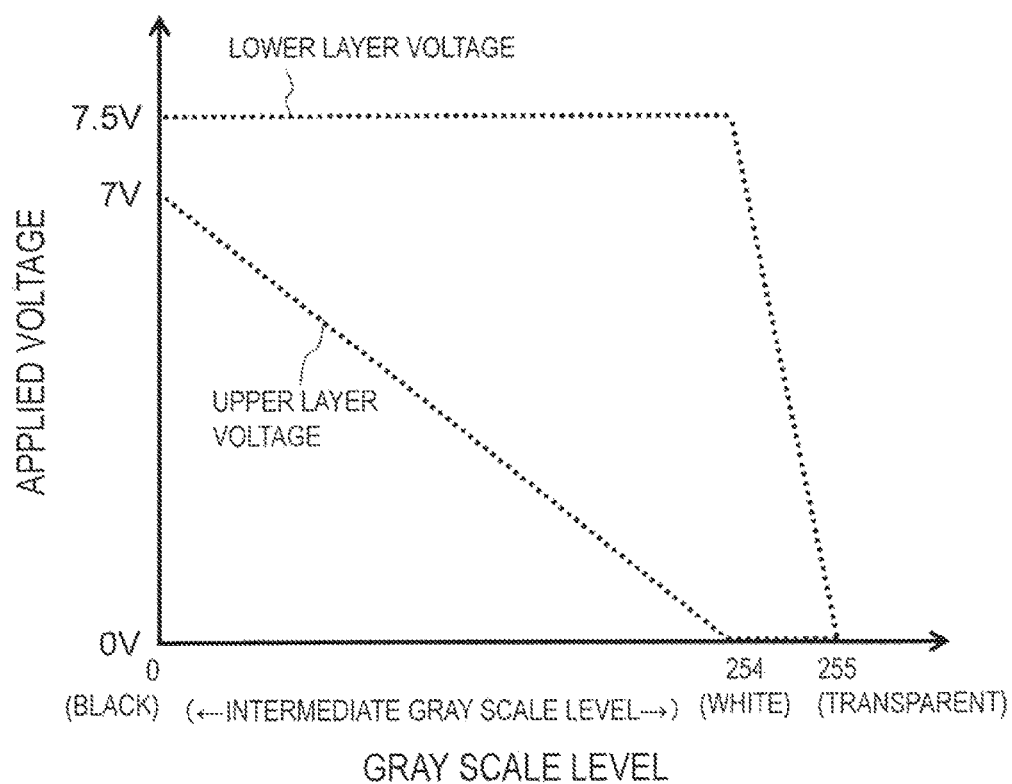
[FIG. 10] A graph showing an exemplary voltage setting (a relationship between an upper layer voltage and a lower layer voltage and the gray scale level) at varying gray scale levels.

FIG. 10 is a graph showing an exemplary voltage setting (a relationship between an upper layer voltage and a lower layer voltage and the gray scale level) at varying gray scale levels. In the example shown in FIG. 10, as the gray scale level increases from the $0^{th}$ gray scale level (corresponding to the black displaying state) to the $254^{th}$ gray scale level (corresponding to the white displaying state), the upper layer voltage becomes lower while the lower layer voltage remains constant. Specifically, while the lower layer voltage remains at 7.5 V, the upper layer voltage changes (lowers) from 7 V to 0 V. In this manner, the intensity of the lateral field is changed, whereby intermediate gray scale levels are displayed. At the $255^{th}$ gray scale level (corresponding to the transparent displaying state), not only the upper layer voltage but also the lower layer voltage becomes 0 V.

Although not shown in FIG. 10, the applied voltage to the counter electrode 21 (counter voltage) is 0 V for all gray scale levels. In black displaying, hardly any lateral field is generated, and essentially only a vertical field is applied across the liquid crystal layer 30 between the upper electrode and lower layer voltage and the counter electrode. In white displaying, the greatest lateral field is applied, and also a vertical field is applied.

In the implementation shown in FIG. 10, the voltages that are applied to the upper electrode and the lower layer voltage during black displaying are slightly varied, i.e., 7 V and 7.5 V, for the following reason. Only the liquid crystal layer 30 exists between the upper electrode and the counter electrode; however, between the lower electrode and the counter electrode, not only the liquid crystal layer 30 but also the insulating layer 13 exists. In this case, by setting the lower layer voltage to be higher than the upper layer voltage, the effective voltage that is applied across the liquid crystal layer 30 can be equalized between the regions where the upper electrode is provided (i.e., line portions of interdigitated electrodes) and the regions where the upper electrode is not provided (i.e., space portions of interdigitated electrodes). As a result, a uniform vertical field can be applied across the liquid crystal layer during black displaying, and thus non-uniform alignments can be restrained from occurring between the line portions and the space portions of the upper electrode.

Thus, the construction of the liquid crystal display device 100 has been described. As described above, in the liquid crystal display device 100 of the present embodiment, which performs multicolor displaying by the field sequential method, the liquid crystal display panel 1 does not need color filters. As a result, the efficiency of light utilization is improved. In the liquid crystal display device 100, a vertical field is generated across the liquid crystal layer 30 in the black displaying state, and a lateral field is generated across the liquid crystal layer 30 in the white displaying state. Therefore, the torque due to voltage application acts on the liquid crystal molecules 31, at both a fall (a transition from the white displaying state to the black displaying state) and a rise (a transition from the black displaying state to the white displaying state). As a result, good response characteristics are attained.

Furthermore, in the liquid crystal display device 100 of the present embodiment, each pixel is capable of exhibiting not only the black displaying state and the white displaying state, but also the transparent displaying state, i.e., a state where no voltage is applied across the liquid crystal layer 30. By displaying the background in this transparent displaying state, the problem of background blur (it being perceived as double images) can be prevented. Hereinafter, the reasons why this problem (doubling blur) occurs in the liquid crystal display devices of Patent Documents 1 to 3 will be described with reference to a liquid crystal display device of Comparative Example.

FIGS. 8(a) and (b) respectively illustrate a state of performing black displaying, and a state of performing white displaying, in a liquid crystal display device 800 according to Comparative Example. The liquid crystal display device 800 of Comparative Example is identical in construction to the liquid crystal display device shown in FIG. 1 and FIG. 2 of Patent Document 3.

The liquid crystal display device 800 includes an array substrate 810 and a counter substrate 820, and a liquid crystal layer 830 interposed therebetween. The array substrate 810 includes: a glass substrate 810a; and a lower electrode 812, an insulating layer 813, and a pair of interdigitated electrodes (upper electrodes) 817 and 818 which are stacked in this order on the glass substrate 810a. On the other hand, the counter substrate 820 includes a glass substrate 820a and a counter electrode 821 formed on the glass substrate 820a.

The liquid crystal layer 830 contains liquid crystal molecules 831 having a positive dielectric anisotropy. In the liquid crystal display device 800, the liquid crystal molecules 831 in the liquid crystal layer 830 take a vertical alignment in the absence of an applied voltage.

In the liquid crystal display device 800 of Comparative Example, when performing black displaying, a predetermined voltage is applied between the counter electrode 821 and the lower electrode 812 and upper electrodes (pair of interdigitated electrodes) 817 and 818 (e.g., a potential of 7 V is given to the counter electrode 821, while a potential of 14 V is given to the lower electrode 812 and upper electrodes 817 and 818), thereby generating a vertical field across the liquid crystal layer 830. As a result, the liquid crystal molecules 831 are aligned substantially vertically to the substrate plane, as shown in FIG. 8(a).

Moreover, when displaying white displaying in the liquid crystal display device 800 of Comparative Example, a predetermined voltage is applied between the pair of interdigitated electrodes 817 and 818 (e.g., a potential of 0 V is given to one interdigitated electrode 817, while a potential of 14 V is given to the other interdigitated electrode 818), thereby generating a lateral field across the liquid crystal layer 830. As a result, the liquid crystal molecules 831 take an alignment which is inclined with respect to the substrate-plane normal direction, as shown in FIG. 8(*b*).

Figure 9:
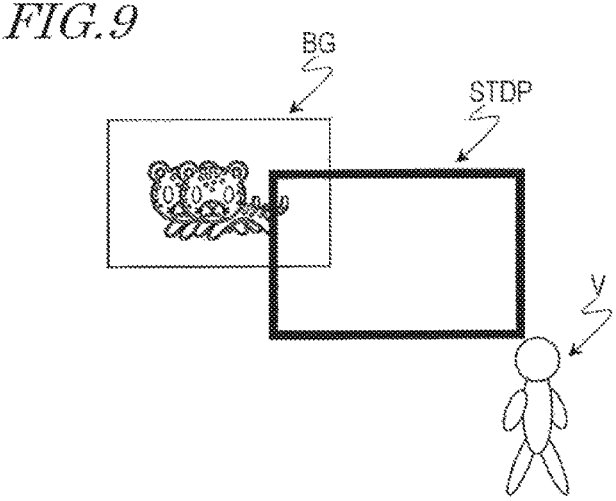
[FIG. 9] A diagram schematically showing how a doubling blur may occur.

When the liquid crystal display device 800 of Comparative Example is straightforwardly used for a see-through display, it will be in the white displaying state, which is a state where the pixel has a high light transmittance, that the liquid crystal display device 800 will perform see-through displaying, i.e., displaying such the background is visible in a see-through manner. However, the state of performing white displaying is a state where the liquid crystal molecules 830 are aligned by applying a lateral field across the liquid crystal layer 830, whereby a distribution of refractive indices will occur within the pixel. Owing to this refractive index distribution, light L from the rear face side is scattered (i.e., the direction of travel of the light L is altered; see FIG. 8(*b*)), thus blurring the background. Consequently, as shown in FIG. 9, the background will be perceived as double images by a viewer V observing the background BG via the see-through display STDP.

Thus, when see-through displaying is performed in the white displaying state, which is state where a lateral voltage is applied across the liquid crystal layer, a doubling blur may possibly occur. On the other hand, the liquid crystal display device 100 of the present embodiment displays the background in a state of highest transmittance (see-through displaying) in a pixel with no voltage being applied across the liquid crystal layer 30 (a transparent displaying state). At this time, the viewer observing the background through the liquid crystal display device 100 will vividly perceive the background. As a result, doubling blurs will be prevented, whereby the quality of see-through displaying is improved.

Note that, during see-through displaying (i.e., the illumination element being turned OFF), the liquid crystal display device 100 of the present embodiment is able to operate in the second mode of displaying, i.e., the background is displayed with a pixel-by-pixel transmittance control with a voltage being applied across the liquid crystal layer 30. In the second mode of displaying, no color rays are emitted from the illuminator 2 and field sequential driving is not being performed.

Also in the second mode of displaying, under a setting such that similar voltages are applied to the lower electrode and to the upper electrode at any arbitrary gray scale level, it becomes possible to maintain a state where no lateral field is essentially applied across the liquid crystal layer 30. As a result of this, a refractive index distribution is restrained from occurring within the pixel, thus preventing doubling blur and improving the quality of see-through displaying. This operation will be described later.

In the first mode of displaying which performs field sequential driving, it may be ensured that the potential difference between the upper electrode 11 and the lower electrode 12 at each gray scale level from the lowest gray scale level to the highest gray scale level is a predetermined ratio or less of the potential difference between the lower electrode 12 and the counter electrode 21 in the black displaying state. More specifically, the potential difference between the upper electrode 11 and the lower electrode 12 at each gray scale level may be a predetermined ratio or less (specifically, 60% or less) of the potential difference between the lower electrode 12 and the counter electrode 21 in the black displaying state.

To describe this specifically, for example, in the example shown in FIG. 10, the upper layer voltage is decreased while keeping the lower layer voltage constant when displaying intermediate levels; therefore, there exists a gray scale level at which the potential difference between the upper electrode 11 and the lower electrode 12 becomes more than 60% of the potential difference between the lower electrode 12 and the counter electrode 21 in the black displaying state. When the voltage setting shown in FIG. 10 is adopted, an abnormal change in alignment may possibly occur when the gray scale level changes.

Figure 11:
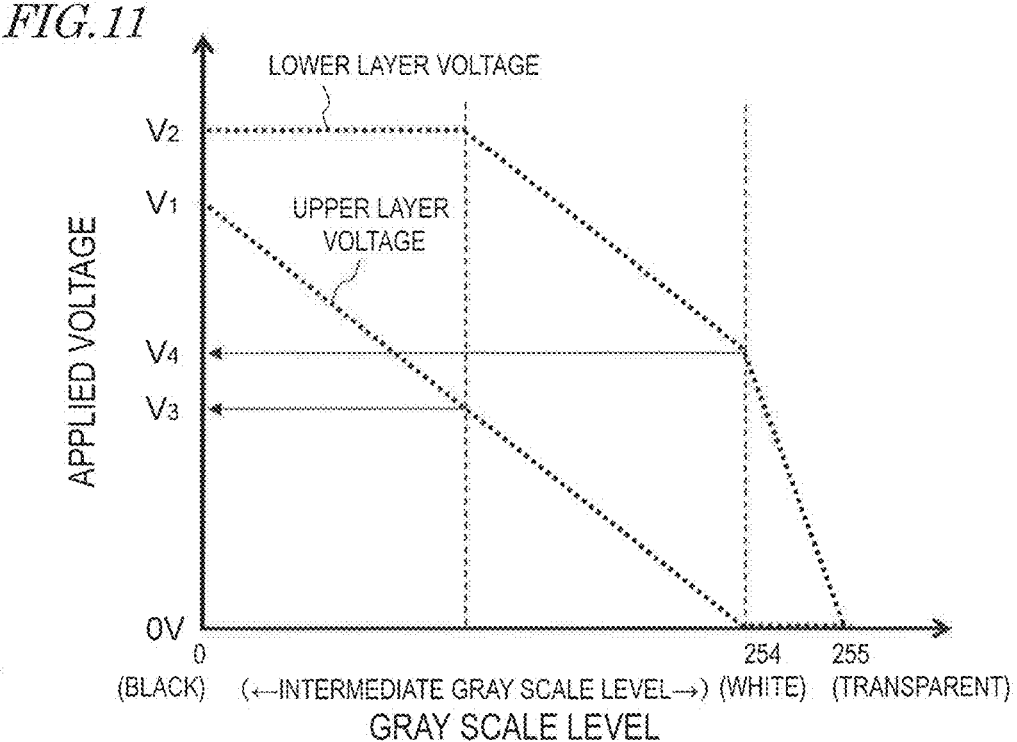
[FIG. 11] A graph showing another exemplary voltage setting (a relationship between an upper layer voltage and a lower layer voltage and the gray scale level) at varying gray scale levels.

On the other hand, as shown in FIG. 11, through voltage control such that the potential difference between the upper electrode 11 and the lower electrode 12 at each gray scale level from the lowest gray scale level to the highest gray scale level is 60% or less of the potential difference between the lower electrode 12 and the counter electrode 21 in the potential difference between the lower electrode 12 and the counter electrode 21 in the black displaying state, the possibility that abnormal change in alignment may occur when the gray scale level changes is reduced, thereby achieving higher-quality displaying.

In the example shown in FIG. 11, the applied voltage to the upper electrode 11 decreases as the gray scale level increases from the lowest gray scale level to the gray scale level corresponding to the white displaying state. Specifically, as the gray scale level increases, the upper layer voltage decreases from $V_1$ (e.g. 7 V) to 0 V. On the other hand, the applied voltage of the lower electrode 12 remains constant from the lowest gray scale level to a certain intermediate gray scale level, and decreases as the gray scale level increases from that intermediate gray scale level to the gray scale level corresponding to the white displaying state. Specifically, the lower layer voltage remains at $V_2$ (e.g. 7.5 V) from the lowest gray scale level to a certain intermediate gray scale level (a gray scale level at which the upper layer voltage is $V_3$), and as the gray scale level increases from that intermediate gray scale level to the gray scale level corresponding to the white displaying state, the lower layer voltage decreases by the same rate as the decrease in the upper layer voltage, from $V_2$ to $V_4$. In other words, in this example, the potential difference between the upper electrode 11 and the lower electrode 12 is set at $V_4$ or less, where $V_4$ is a rate of 60% or less of the potential difference $V_2$ between the lower electrode 12 and the counter electrode 21 in the black displaying state.

In International Publication No. 2016/035578 the inventors have described that, when the potential difference between the upper electrode 11 and the lower electrode 12 at each gray scale level from the lowest gray scale level to the highest gray scale level is 60% or less of the potential difference between the lower electrode 12 and the counter electrode 21 in the black displaying state, abnormal changes in alignment can be properly suppressed. For referencing sake, the entire disclosure of International Publication No. 2016/035578 is incorporated herein by reference.

More preferably, the potential difference between the upper electrode 11 and the lower electrode 12 at each gray scale level from the lowest gray scale level to the highest gray scale level is 54% or less, and still more preferably 47% or less, of the potential difference between the lower electrode 12 and the counter electrode 21 in the black displaying state. However, if the maximum potential difference between the upper electrode 11 and the lower electrode 12 is too small, the response speed might decrease. Therefore, from the standpoint of response characteristics, the aforementioned rate is preferably 30% or more, and more preferably 40% or more, in the first mode of displaying.

Hereinafter, as an application of displaying by the liquid crystal display device 100 in the aforementioned transparent displaying state, a second mode of displaying in which see-through displaying is performed through a liquid crystal display panel whose transmittance is controlled in a pixel-by-pixel manner will be described.

In the second mode of displaying, the illumination element 2 on the rear face of the liquid crystal display panel 1 is placed in an OFF state, so that the illumination element 2 maintains a light transmitting state. In the second mode of displaying, field sequential driving is not performed. The second mode of displaying is non-field sequential driving. In this context, the pixel driving frequency may be a frequency (e.g., 60 Hz) which is lower than the frequency (e.g., 240 Hz) during field sequential driving. Under driving with a lower frequency, a relatively low response speed is required of the liquid crystal molecules.

Figure 12:
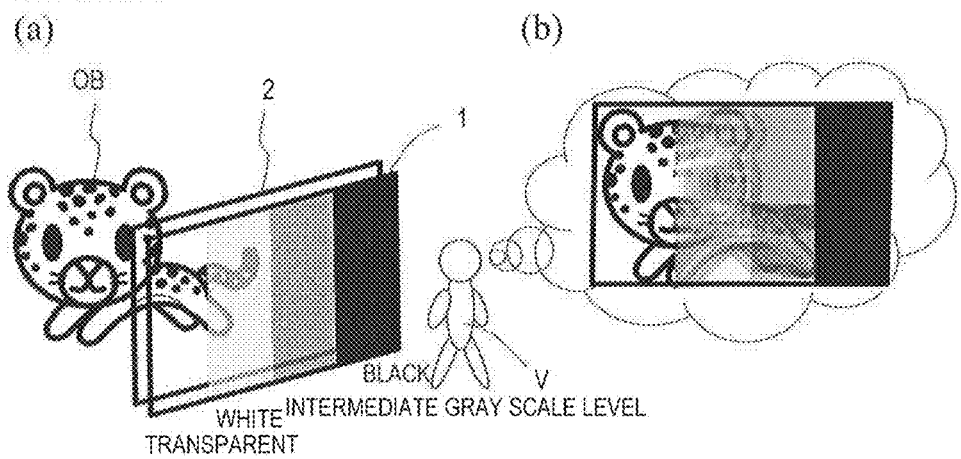
[FIG. 12] A diagram showing how the background may be displayed in a second mode of displaying, where (a) is a perspective view illustrating how a viewer may observe the background, and (b) shows a background image to be actually observed.

FIG. 12(a) shows how the liquid crystal display device 100 may be deployed in the second mode of displaying. While the illumination element 2 is kept OFF, a viewer V is able to observe an object OB at its rear face, through the liquid crystal display panel 1 and through the illumination element 2. Note that, when field sequential driving is performed in the first mode of displaying, color rays are sequentially emitted from the illumination element 2 on the rear face, so that the viewer V will observe a multicolor image on the liquid crystal display panel 1. Therefore, in the first mode of displaying, the viewer V will never observe the object OB at the rear face through the liquid crystal display panel.

In the second mode of displaying, the liquid crystal display panel 1 includes pixels which are controlled into either the transparent displaying state, the white displaying state, the intermediate level displaying state, or the black displaying state.

What is explained here as the transparent displaying state is a state where the pixels are controlled to have the maximum transmittance, which is similar to the transparent displaying state under the first mode of displaying. In the transparent displaying state, the upper electrode, the lower electrode, and the counter electrode are controlled to the same potential (which typically is 0 V), and neither a vertical field nor a lateral field is applied across the liquid crystal layer 30.

On the other hand, the white displaying state and intermediate level displaying states under the second mode of displaying are meant to be states where the liquid crystal display panel 1 is controlled with a voltage being applied across the liquid crystal layer so that the pixel transmittance is lower than in the aforementioned transparent displaying state, but the illuminator 2 is controlled into an OFF state so as to transmit external light (i.e., the background can be perceived).

However, the inventors have found that, if a voltage setting for field sequential driving as shown in FIG. 10 or FIG. 11 is applied in the second mode of displaying, a blur may occur in a part of the background image, as shown in FIG. 12(b). More specifically, as shown in FIG. 12(b), the background to be observed through a pixel in the liquid crystal display panel 1 which is controlled to take the white displaying state (the aforementioned 254$^{th}$ gray scale level) or any intermediate level displaying state (the aforementioned 1$^{st}$ to 253$^{th}$ gray scale levels) will appear blurred. As a result of this, the background may not be clearly seen in anywhere but the pixel region which is controlled into the aforementioned transparent displaying state (255$^{th}$ gray scale level). In regions which are controlled into the black displaying state (the 0$^{th}$ gray scale level), the background will not be observed.

Figure 13:
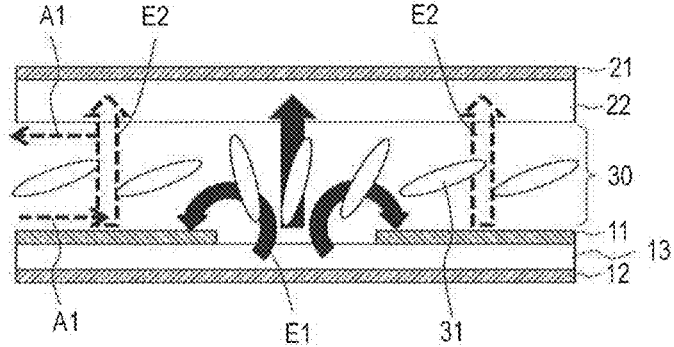
[FIG. 13] A cross-sectional view showing an alignment in the liquid crystal layer in the case where a voltage setting for field sequential driving (FIG. 10, FIG. 11) is applied.

FIG. 13 shows an alignment of liquid crystal molecules during intermediate level displaying, in the case where a voltage setting for field sequential driving as shown in FIG. 10 or FIG. 11 is applied in the second mode of displaying. Note that FIG. 1 illustrates the upper electrode 11 and the lower electrode 13 included in the liquid crystal display panel, as well as how liquid crystal molecules 31 may be aligned in the liquid crystal layer 30 interposed between the counter electrode 21 and the overcoat layer 22 (i.e., a pair of glass substrates sandwiching the liquid crystal layer 30 and horizontal alignment films are omitted).

In the liquid crystal display panel shown in FIG.

13, the direction of alignment regulation (e.g., rubbing direction) A1 that defines an alignment direction of the liquid crystal molecules in the absence of an applied voltage is set so as to be mutually antiparallel above and below the liquid crystal layer 30. A display device of this implementation will be described later. However, the directions of alignment regulation may be set so as to achieve a 90° twist alignment, as illustrated in FIG. 1 or the like.

As shown in FIG. 13, during intermediate level displaying in the second mode of displaying, when a relatively large voltage is applied between the upper electrode 11 and the lower electrode 12 (FIG. 10 or FIG. 11), a lateral field (fringing field) is generated in addition to a vertical field which is generated between the upper electrode 11 and lower electrode 12 and the counter electrode 21. Under the influence of this lateral field, regions in which a strong electric field E1 is applied across the liquid crystal layer 30 and regions in which a weak electric field E2 is applied are created within the pixel. These regions are created in a periodic manner, because of the periodic arrangement of the line portions and space portions of the upper electrode (combtooth portions and interspace portions of the upper electrode).

When such periodic differences in electric field distribution exist within the pixel, the liquid crystal alignment and refractive index distribution within the pixel will not be uniform, thus causing a blur in the object at the rear face to be observed through the liquid crystal display panel. This is considered to be because the refractive index distribution that has occurred causes diffraction and other effects. In the first mode of displaying which performs field sequential driving, display quality will not be much affected even if the liquid crystal alignment shown in FIG. 13 is being presented at an intermediate gray scale level. In the first mode of displaying, due to the generation of a lateral field, a fast response speed which is suitable for field sequential driving can be achieved.

Figure 14:
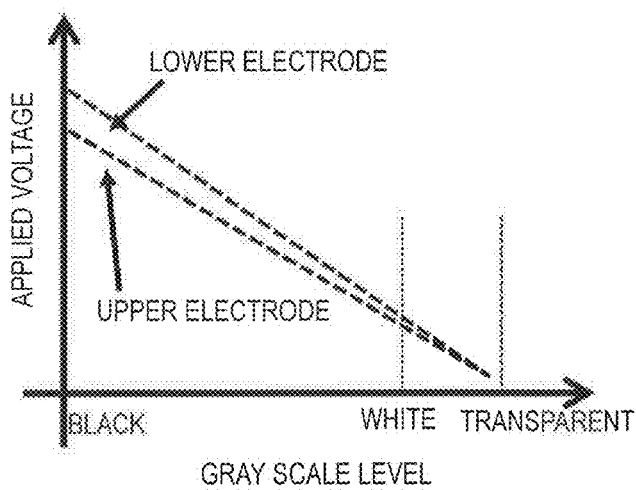
[FIG. 14] A graph showing an example voltage setting (relationship between upper layer and lower layer voltages and the gray scale level) at varying gray scale levels, in the second mode of displaying, according to an embodiment of the present invention.

Therefore, in the second mode of displaying according to the present embodiment, as shown in FIG. 14, in an intermediate level displaying state or the white displaying state, the difference between the voltage to be applied to the lower electrode 12 (lower layer voltage) and the voltage to be applied to the upper electrode 11 (upper layer voltage) is set to be smaller than that in the first mode of displaying (FIG. 10 and FIG. 11). More specifically, in the present embodiment, the difference between the lower electrode voltage and the voltage upper electrode is set to be smaller than the potential difference during black displaying, at any and all gray scale levels except the black displaying.

Now, the black displaying state (0$^{th}$ gray scale level) and the transparent displaying state (255$^{th}$ gray scale level) may be under a similar voltage setting to that in the first mode of displaying. In the implementation shown in FIG. 14, the lower layer voltage is e.g. 7.5 V and the upper layer voltage is e.g. 7.0 V in the black displaying state.

By introducing this difference, as described above, the effective voltage to be applied across the liquid crystal layer 30 can be made equal across the entire pixel region. In the transparent displaying state, the upper layer voltage and the lower layer voltage are both 0 V. Although not shown in FIG. 14, the applied voltage (counter voltage) to the counter electrode 21 is 0 V across all gray scale levels.

Thus, in the intermediate level displaying or the white displaying state, by setting the potential difference between the upper electrode and the lower electrode to be equal to or less than the potential difference in the black displaying, a large lateral field is prevented from being generated, whereby deteriorations in the quality with which the background is displayed can be suppressed. The white displaying and any intermediate level displaying which is performed with the potential difference between the upper electrode and the lower electrode being equal to or less than the potential difference in the black displaying can be regarded as controlling the alignment of liquid crystal molecules by using essentially only a vertical field.

Now, with reference to FIG. 24, a state in which essentially only a vertical field is applied across the liquid crystal layer will be described.

Figure 24:
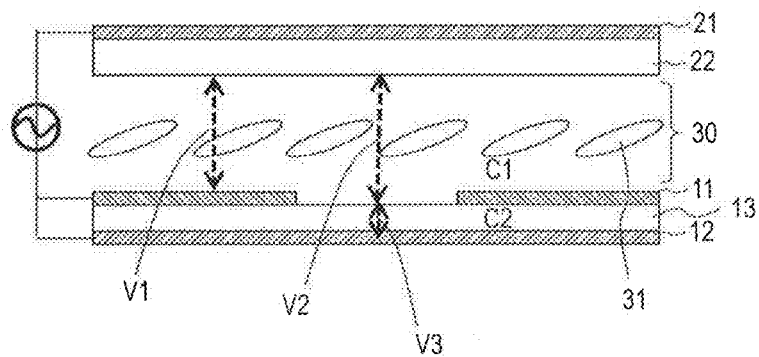
[FIG. 24] A cross-sectional view for describing a state where there is essentially only a vertical field being generated.

As shown in FIG. 24, when the same voltage V0 is applied to the upper electrode 11 and the lower electrode 12, an effective voltage V1 (=V0) is applied across the liquid crystal layer 30 on the line portions of the upper electrode 11. On the other hand, on the space portions of the upper electrode, an effective voltage V2 is applied across the liquid crystal layer 30, and a voltage V3 is applied across the insulating layer 13. Herein, V1=V2+V3. Assuming that the liquid crystal layer has an electrical capacitance C1 and that the insulating layer has an electrical capacitance C2, V2 is expressed as $V2=C2/(C1+C2)\cdot V0$ and V3 is expressed as $V3=C1/(C1+C2)\cdot V0$.

Thus, even when the same voltage V0 is applied to the upper electrode 11 and the lower electrode 12, the liquid crystal layer 30 experiences a difference V1−V2(=V3) in effective voltage between the line portions and the slit portions, with slightly different alignments of liquid crystal molecules, too. However, in the present specification, such slight disorders in alignment that may occur even by applying the same voltage to the upper electrode and the lower electrode are to be tolerated, and any such state will also be regarded as there being only a vertical field applied.

A voltage setting in which the difference between the voltage VU applied to the upper electrode and the voltage VL applied to the lower electrode is equal to or less than the aforementioned V3 is to be regarded as a voltage setting that applies only a vertical field. In other words, the condition VL−VU≤V3 being satisfied is regarded as only a vertical field being applied. Herein, V3 may be defined as $V3=C1/(C1+C2)\cdot VL$.

The example shown in FIG. 14 is set so that the difference between the lower layer voltage and the upper layer voltage becomes larger at gray scale levels that are closer to black displaying, and smaller at gray scale levels that are closer to white displaying. To give a more specific example, for instance, the voltages may be set so that lower layer voltage=7.5 V, upper layer voltage=7 V during black displaying; lower layer voltage=upper layer voltage=0 V during transparent displaying; and a voltage ratio of upper layer/lower layer is maintained at 7/7.5 at any gray scale level.

In this implementation, based on the voltage during black displaying as a reference, the rates of decrease in the lower layer voltage and the upper layer voltage with respect to changes in the gray scale level are both constant. In this manner, by setting the voltages so that the voltage ratio of upper layer/lower layer is substantially constant (e.g., so that the voltage ratio has a fluctuation of 10% or less) at each gray scale level, in the second mode of displaying, white displaying and intermediate level displaying are performed by essentially using only a vertical field that is uniform across the entire pixel. As a result, a voltage setting is realized such that the refractive index distribution within the pixel is uniform at any given gray scale level.

With the voltage setting shown in FIG. 14, alignment control is performed by using essentially only a vertical field, and no lateral field is used, and therefore a similar response speed to that of a usual TN is attained. In the second mode of displaying, the response speed of liquid crystal molecules becomes lower than in the first mode of displaying. However, since field sequential driving is not performed during the see-through displaying in the second mode of displaying, the display quality is not unfavorably affected even with a TN-level response speed.

Figure 15:
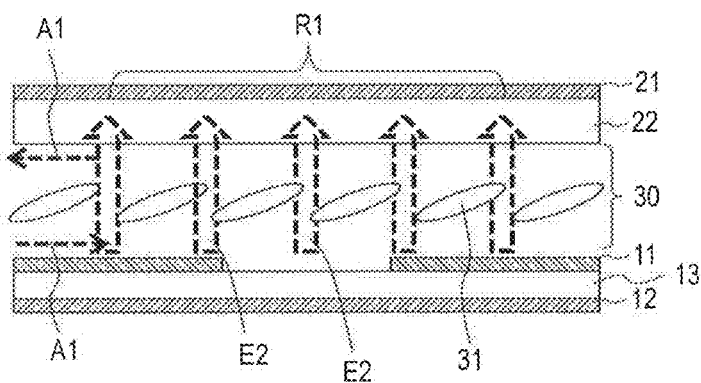
[FIG. 15] A cross-sectional view showing an alignment in the liquid crystal layer in the case where a voltage setting which is shown in FIG. 14 is applied.

FIG. 15 shows an alignment of liquid crystal molecules during intermediate level displaying, in the case of adopting the voltage setting shown in FIG. 14. As shown in FIG. 15, essentially no lateral field is generated, and therefore a weak vertical field E2 is uniformly created across the entire pixel. In other words, since a uniform electric field distribution is realized, irrespective of whether on the line portions or the spaces of the upper electrode 11, the alignment direction of liquid crystal molecules is made uniform in the pixel region R1. As a result, the refractive index distribution within the pixel can be made uniform, thus suppressing blurs.

Figure 16:
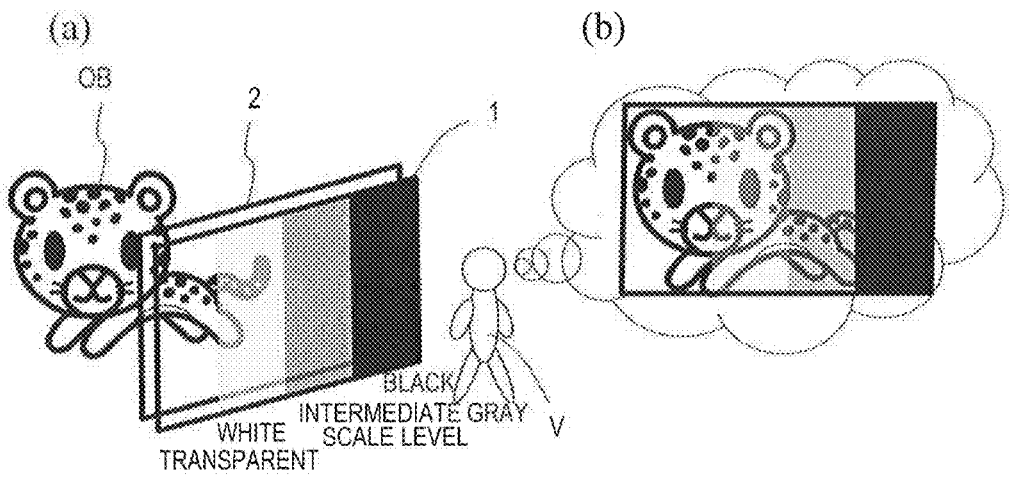
[FIG. 16] A diagram showing how the background may be displayed in a second mode of displaying, where (a) is a perspective view illustrating how a viewer may observe the background, and (b) shows a background image to be actually observed.

FIGS. 16(a) and (b) show how the liquid crystal display device 100 may be deployed in the case where the voltage setting shown in FIG. 14 is applied. As shown in FIG. 15, the refractive index distribution within the pixel is uniform also during intermediate level displaying (and similarly during white displaying), any phenomenons such as diffraction do not occur, and blurs of portions located at the rear face are eliminated as shown in FIG. 16(b). As a result, a clear see-through displaying can be achieved.

Thus, in a see-through display, when effecting the display's displaying while allowing an object on the rear face to be seen in the second mode of displaying, essentially only a vertical field is used to control the alignment of liquid crystal molecules (transmittance control) for each pixel, in such a manner that the liquid crystal refractive index distribution within the pixel will be uniform. As the refractive index distribution within the pixel becomes uniform, blur is eliminated, so that the background can be clearly seen at any given gray scale level.

Figure 17:
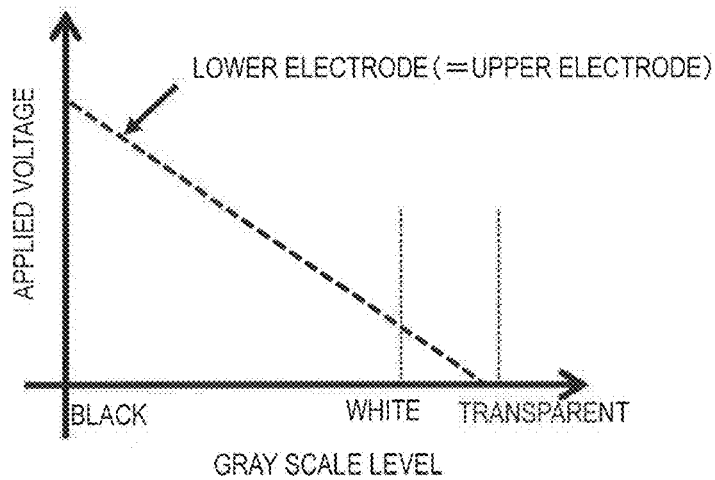
[FIG. 17] A graph showing an example voltage setting (relationship between upper layer and lower layer voltages and the gray scale level) at varying gray scale levels, in the second mode of displaying, according to another embodiment of the present invention.

FIG. 17 shows another exemplary voltage setting, different from the example shown in FIG. 14. In the example shown in FIG. 17, during all of black displaying, intermediate level displaying, white displaying, and transparent displaying, the voltages to be applied to the upper electrode and the lower electrode are set equal. To give a more specific example, in the example shown in FIG. 17, for instance, the lower layer voltage=upper layer voltage=7.5 V during black displaying, and lower layer voltage=upper layer voltage=0 V during transparent displaying. Although not shown in FIG. 17, the applied voltage (counter voltage) to the counter electrode 21 is 0 V across all gray scale levels.

Also in this case of setting the lower layer voltage and the upper layer voltage equal irrespective of the gray scale level, it is ensured that the rates of decrease in the lower layer voltage and the upper layer voltage with respect to changes in the gray scale level are both constant (i.e., the level of applied voltage relative to the gray scale level can be defined as a linear function).

This implementation where the same voltage is applied to the lower layer voltage and the upper layer voltage provides an advantage of simplified circuitry as compared to the implementation where different voltages are applied as shown in FIG. 14.

Note that, even when the same voltage is applied to the lower electrode and the upper electrode as shown in FIG. 17, intermediate level displaying and white displaying are to be performed by using essentially only a vertical field. As described above, in the liquid crystal layer, even when the same voltage is applied to the upper electrode and the lower electrode, the level of the effective voltage to be applied across the liquid crystal layer will differ between the line portions and the space portions of the upper electrode, depending on whether the insulating layer 13 is interposed therebetween or not. Therefore, a distribution of refractive indices may occur. However, the voltage difference to occur when the same voltage is applied to the upper electrode and the lower electrode is little, and will hardly affect the display quality in actuality. In the present specification, such a case will also be collectively expressed as applying an essentially uniform vertical field.

Figure 18:
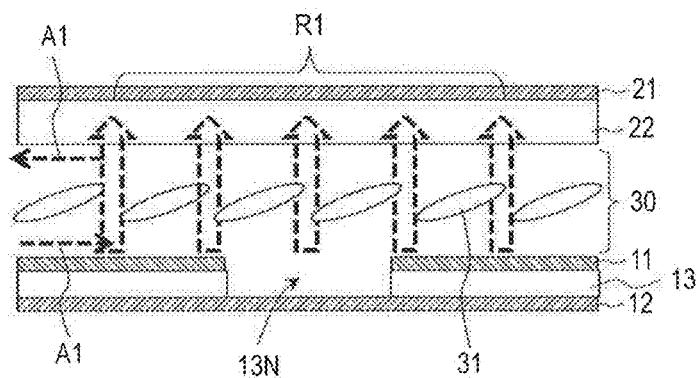
[FIG. 18] A cross-sectional view of a liquid crystal display panel according to still another embodiment of the present invention.

FIG. 18 shows a cross section of a liquid crystal display panel having a different construction from the construction shown in FIG. 15. In the implementation shown in FIG. 18, a more uniform vertical field is formed by the liquid crystal layer even when using the voltage setting shown in FIG. 17, whereby the background can be suitably shown. Note that constituent elements similar to those in the liquid crystal display panel shown in FIG. 15 are denoted by like reference numerals and their description will be omitted.

In the liquid crystal display panel shown in FIG. 18, in the regions corresponding to the space portions of the upper electrode 11, the insulating layer 13 between the upper electrode 11 and the lower electrode 12 is partially removed, thereby forming apertures 13N in the insulating layer. Thus, by exposing the lower electrode 12 between adjoining line portions of the upper electrode 11, closer electrical properties are introduced between the upper electrode 11 and the counter electrode 21, and between the lower electrode 12 exposed through the aperture 13N and the counter electrode 21.

With this construction, as shown in FIG. 17, even when the same voltage is applied to the upper electrode 11 and the lower electrode 12, a more uniform vertical field can be generated by the liquid crystal layer within the pixel. In the implementation shown in FIG. 18, the overcoat layer 22 does not need to be provided.

In the liquid crystal display device 100 of the present embodiment as described above, each pixel is capable of switchably presenting the black displaying state, the white displaying state, or the transparent displaying state.

In the mode of displaying in which the background is displayed, including the transparent displaying state, the potential difference between the upper layer voltage and the lower layer voltage is little, if any, whereby doubling blurs can be prevented.

In the above embodiments, liquid crystal molecules 31 in the liquid crystal layer 30 take a twist alignment in the transparent displaying state. This allows a more vivid (clearer) transparent displaying to be realized. Under a twist alignment, the liquid crystal molecules 31 are oriented in an identical direction within a plane which is parallel to the display surface; therefore, any diffraction associated with refractive index differences within the plane, or any diffraction associated with dark lines ascribable to the liquid crystal mode (i.e., dark lines caused by structures for regulating the alignment direction, or points of discontinuous alignment directions that may occur within the plane) does not occur.

The example illustrated herein is a construction where liquid crystal molecules 31 near the center along the thickness direction of the liquid crystal layer 30 are aligned substantially orthogonal to the slit direction D (that is, an average orientation direction in the bulk liquid crystal is substantially orthogonal to the slit direction D) in the white displaying state and in the transparent displaying state. Alternatively, a construction where liquid crystal molecules 31 near the center along the thickness direction of the liquid crystal layer 30 are aligned substantially parallel to the slit direction D (that is, an average orientation direction in the bulk liquid crystal is substantially parallel to the slit direction D) in the white displaying state and in the transparent displaying state may be adopted. However, from the standpoint of brightness of display, the former construction (which hereinafter may also be referred to as the "orthogonal type") is more preferable than the latter construction (which hereinafter may also be referred to as the "parallel type").

Figure 19:
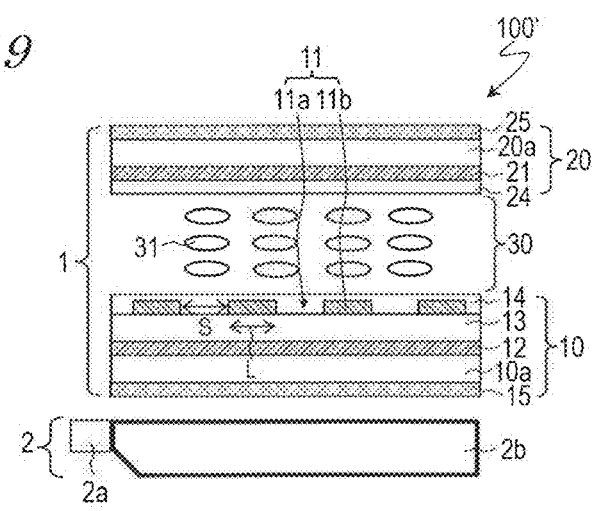
[FIG. 19] A cross-sectional view schematically showing another liquid crystal display device 100' according to an embodiment of the present invention.
Figure 20:
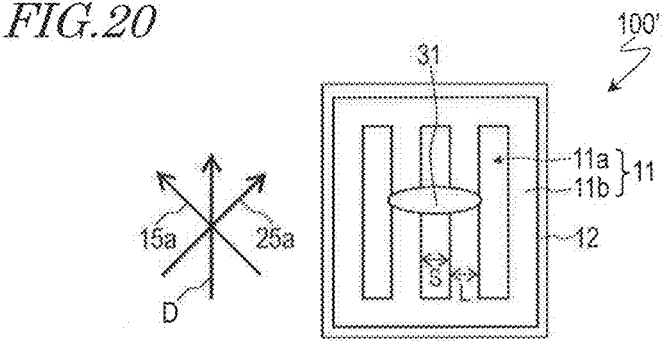
[FIG. 20] A plan view schematically showing another liquid crystal display device 100' according to an embodiment of the present invention.

Moreover, as in a liquid crystal display device 100' shown in FIG. 19 and FIG. 20, a construction may be adopted where liquid crystal molecules 31 in the liquid crystal layer 30 take a homogeneous alignment in a transparent displaying state.

In the liquid crystal display device 100', the pretilt direction defined by each of the first horizontal alignment film 14 and the second horizontal alignment film 24 is set so that the liquid crystal molecules 31 will take a homogeneous alignment in a state where no voltage is applied to the liquid crystal layer 30 (i.e., a state where no electric field is generated). Specifically, the pretilt direction defined by each of the first horizontal alignment film 14 and the second horizontal alignment film 24 is substantially orthogonal to the direction that the slits 11*a* in the upper electrode 11 extend (slit direction) D. In other words, the pretilt direction defined by the first horizontal alignment film 14 and the pretilt direction defined by the second horizontal alignment film 24 are parallel or antiparallel to each other.

Moreover, the respective transmission axes 15*a* and 25*a* of the first polarizing plate 15 and the second polarizing plate 25 constitute an angle of about 45° with the pretilt direction that is defined by each of the first horizontal alignment film 14 and the second horizontal alignment film 24. Therefore, the respective transmission axes 15*a* and 25*a* of the first polarizing plate 15 and the second polarizing plate 25 constitute an angle of about 45° with the slit direction D.

Figure 21:
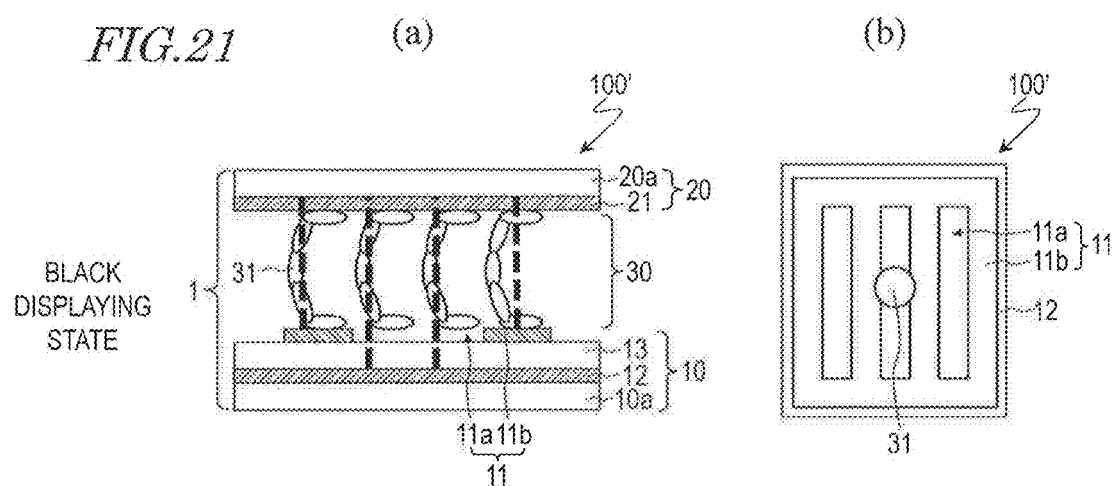
[FIGS. 21] (a) and (b) are a cross-sectional view and a plan view showing an alignment of liquid crystal molecules 31 in a black displaying state of the liquid crystal display device 100'.

FIGS. 21(*a*) and (*b*) show an alignment of liquid crystal molecules 31 in a black displaying state. In the black displaying state, a predetermined voltage is applied between the counter electrode 21 and the upper electrode 11 and lower electrode 12 (e.g., potentials of 7 V, 7.5 V, and 0 V are respectively given to the upper electrode 11, the lower electrode 12, and the counter electrode 21), whereby a vertical field is generated across the liquid crystal layer 30. FIG. 21(*a*) schematically shows the electric lines of force in this state with broken lines.

In this black displaying state, as shown in FIGS. 21(*a*) and (*b*), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30).

Figure 22:
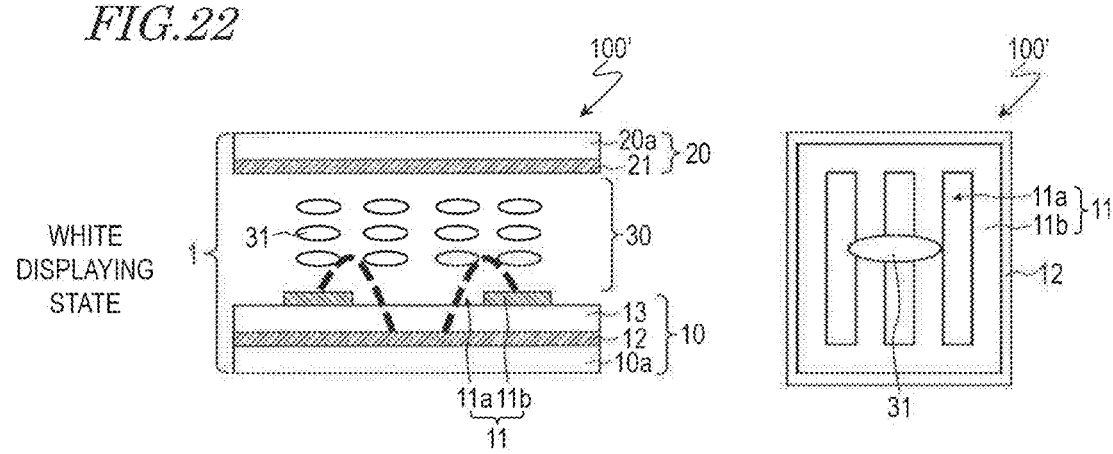
[FIGS. 22] (a) and (b) are a cross-sectional view and a plan view showing an alignment of liquid crystal molecules 31 in a white displaying state of the liquid crystal display device 100'.

FIGS. 22(a) and (b) show an alignment of liquid crystal molecules 31 in a white displaying state. In the white displaying state, a predetermined voltage is applied between the upper electrode 11 and the lower electrode 12 (e.g., potentials of 0 V, 7.5 V, and 0 V are respectively given to the upper electrode 11, the lower electrode 12, and the counter electrode 21), thereby generating a lateral field (fringing field) across the liquid crystal layer 30. FIG. 22(a) schematically shows the electric lines of force in this state with broken lines.

In this white displaying state, as shown in FIGS. 22(a) and (b), the liquid crystal molecules 31 in the liquid crystal layer 30 are aligned substantially parallel to the substrate plane (i.e., substantially vertically to the layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute an angle of about 45° with the respective transmission axes 15a and 25a of the first polarizing plate 15 and the second polarizing plate 25.

Figure 23:
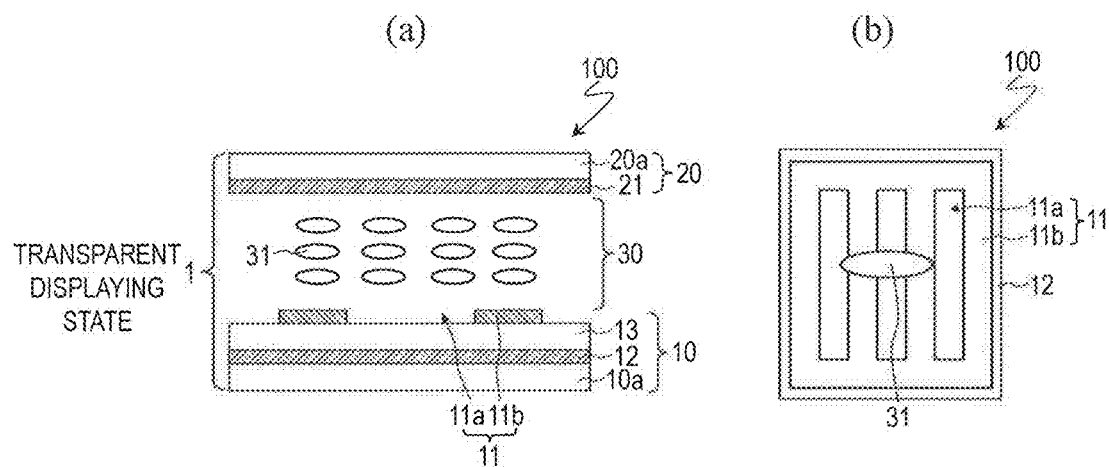
[FIGS. 23] (a) and (b) are a cross-sectional view and a plan view showing an alignment of liquid crystal molecules 31 in a transparent displaying state of the liquid crystal display device 100'.

FIGS. 23(a) and (b) show an alignment of liquid crystal molecules 31 in a transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, as shown in FIGS. 23(a) and (b), the liquid crystal molecules 31 in the liquid crystal layer 30 take a homogeneous alignment. In other words, the liquid crystal molecules 31 are aligned substantially parallel to the substrate plane (i.e., substantially vertically to layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute an angle of about 45° with the respective transmission axes 15a and 25a of the first polarizing plate 15 and the second polarizing plate 25. The light transmittance of each pixel of the liquid crystal display device 100' is the highest in this transparent displaying state (i.e., higher than those in the black displaying state and the white displaying state).

In the liquid crystal display device 100', too, a vertical field is generated across the liquid crystal layer in the black displaying state, and a lateral field is generated across the liquid crystal layer 30 in the white displaying state. Therefore, the torque due to voltage application acts on the liquid crystal molecules 31, at both a fall (a transition from the white displaying state to the black displaying state) and a rise (a transition from the black displaying state to the white displaying state). As a result, good response characteristics are attained. Moreover, each pixel is capable of exhibiting not only the black displaying state and the white displaying state, but also the transparent displaying state, i.e., a state where no voltage is applied across the liquid crystal layer 30; therefore, the problem of background blur (it being perceived as double images) can be prevented. Furthermore, when displaying the background during non-field sequential driving in which the illuminator is kept off, displaying of white to intermediate gray scale levels is performed by using essentially only a vertical field, whereby blurring of the background can be prevented.

INDUSTRIAL APPLICABILITY

According to an embodiment of the present invention, there is provided a liquid crystal display device which excels in both response characteristics and display quality, the liquid crystal display device being suitable for use as a see-through display. A liquid crystal display device (see-through display) according to an embodiment of the present invention is used as a display device for an information display system or digital signage, for example.

REFERENCE SIGNS LIST 1 liquid crystal display panel
2 illumination element
2a light source unit
2b light guide plate
10 first substrate (rear substrate)
10a transparent substrate
11 first electrode (upper electrode)
11a slit (space portion)
11b branch portion (line portion)
12 second electrode (lower electrode)
13 insulating layer
14 first horizontal alignment film
15 first polarizing plate
15a transmission axis of first polarizing plate
16A first TFT
16B second TFT
17 gate bus line
18 source bus line
20 second substrate (front substrate)
21 third electrode (counter electrode)
22 overcoat layer
24 second horizontal alignment film
25 second polarizing plate
30 liquid crystal layer
31 liquid crystal molecules
100, 100' liquid crystal display device

The invention claimed is:
1. A liquid crystal display device comprising:
a liquid crystal display panel including a first substrate and a second substrate opposed to each other and a liquid crystal layer interposed between the first substrate and the second substrate; and
an illumination element provided at a rear face of the liquid crystal display panel, the illumination element being capable of switchably irradiating the liquid crystal display panel with a plurality of color rays and being light-transmissive when not radiating any color rays,
the liquid crystal display device having a plurality of pixels arranged in a matrix array on the liquid crystal display panel, wherein,
the first substrate includes a first electrode provided in each of the plurality of pixels, and a second electrode provided under the first electrode via an insulating layer, the second electrode generating a lateral field across the liquid crystal layer in cooperation with the first electrode;
the second substrate includes a third electrode opposed to the first electrodes and the second electrodes, the third electrode generating a vertical field across the liquid crystal layer in cooperation with the first electrode and the second electrode;
the liquid crystal display device is configured to be capable of switching between a first mode of displaying where multicolor displaying is performed by using the plurality of color rays emitted from the illumination element and a second mode of displaying where a background is allowed to be perceived through the illumination element with no color rays being emitted from the illumination element;

each of the plurality of pixels is, under the first mode of displaying, capable of switchably presenting a black displaying state of performing black displaying with a vertical field being generated across the liquid crystal layer, a white displaying state of performing white displaying with a lateral field being generated across the liquid crystal layer, or a transparent displaying state of allowing the rear face side of the liquid crystal display panel to be visible in a see-through manner with no voltage being applied across the liquid crystal layer, and, under the second mode of displaying, capable of switchably presenting a black displaying state of performing black displaying with a vertical field being generated across the liquid crystal layer, a transparent displaying state of allowing the rear face side of the liquid crystal display panel to be visible in a see-through manner with no voltage being applied across the liquid crystal layer, a white displaying state of performing white displaying with essentially only a vertical field being generated across the liquid crystal layer, or an intermediate level displaying state of performing intermediate level displaying with essentially only a vertical field being generated across the liquid crystal layer.

2. The liquid crystal display device of claim 1, wherein, under the second mode of displaying, a first potential difference exists between the first electrode and the second electrode in the black displaying state, and, in the intermediate level displaying state and the white displaying state, a potential difference exists between the first electrode and the second electrode which is smaller than the first potential difference.

3. The liquid crystal display device of claim 1, wherein, under the first mode of displaying, a second potential difference exists between the first electrode and the second electrode in the white displaying state, and, under the second mode of displaying, a third potential difference which is smaller than the second potential difference exists in the white displaying state.

4. The liquid crystal display device of claim 1, wherein, under the second mode of displaying, an applied voltage to the first electrode and an applied voltage to the second electrode become lower with an increasing gray scale level from a lowest gray scale level to a gray scale level corresponding to the white displaying state.

5. The liquid crystal display device of claim 4, wherein, under the second mode of displaying, the applied voltage to the first electrode and the applied voltage to the second electrode become lower, at a constant rate, with an increasing gray scale level from the lowest gray scale level to the gray scale level corresponding to the white displaying state.

6. The liquid crystal display device of claim 5, wherein a ratio of the applied voltage to the second electrode to the applied voltage to the first electrode is kept substantially constant between the lowest gray scale level and the gray scale level corresponding to the white displaying state.

7. The liquid crystal display device of claim 6, wherein, under the second mode of displaying, the applied voltage to the first electrode and the applied voltage to the second electrode remains equal between the lowest gray scale level and the gray scale level corresponding to the white displaying state.

8. The liquid crystal display device of claim 1, further comprising an insulating layer interposed between the first electrode and the second electrode, wherein, the first electrode includes a line portion and a space portion; and the insulating layer is exposed in a region corresponding to the space portion.

9. The liquid crystal display device of claim 1, wherein multicolor displaying is performed by a field sequential method under the first mode, and multicolor displaying by a field sequential method is not performed under the second mode.

* * * * *